TRANSISTOR STRUCTURE

Filed Oct. 21, 1958

INVENTOR
Walter R. Runyan

BY Stevens, Davis, Miller & Mosher
ATTORNEYS

United States Patent Office 2,948,835

Patented Aug. 9, 1960

2,948,835

TRANSISTOR STRUCTURE

Walter R. Runyan, Dallas, Tex., assignor to Texas Instruments Incorporated, Dallas, Tex., a corporation of Delaware Filed Oct. 21, 1958, Ser. No. 768,581

3 Claims. (Cl. 317—234)

The present invention relates to a novel transistor construction which is particularly characterized by the ability to dissipate large amounts of heat. More particularly, the present invention relates to a novel transistor construction wherein a transistor bar is assembled in a fashion whereby to increase heat dissipation.

The need for cooling is fully appreciated when it is realized that the collector circuit wire of the transistor often carries a current having a density which may be as high as 4,000 amperes per square inch. As a result of this high current density arrangement, localized self-heating effects around the contact locations combined with ambient temperature changes tend to affect the overall performance characteristics of the transistor. It is also well recognized that transistor action is somewhat limited by the temperature to which the transistor is subjected during operation, and severe changes in ambient temperature conditions can cause loss of transistor action.

To avoid overheating, forced circulation of a fluid through the space surrounding the transistor would be an efficient way of obtaining sufficient cooling. However, in any instance, there is a need for a compact self-contained transistor unit. This requirement mitigates against the use of a heat exchange medium except for isolated instances and favors the use of a self-sustaining cooling method. Various suggestions have been made in the prior art to provide a solution to this problem, and which will enable transistors to operate at higher power outputs without unduly increasing the temperature in the region of the junctions. In the conventional arrangement, the transistor is prepared and mounted in an acceptable conventional manner on a header such as, for example, a conventional ceramic or glass pinned base. These types of bases are commercially available. A can is placed over the transistor and sealed to the metallized edges of the header. The metallized edge of the header usually comprises a "Kovar" ring. "Kovar" is the registered trademark for a glass-sealing alloy consisting of 20% nickel, 17% cobalt, 0.2% manganese and the balance iron. It has the same coefficient of expansion as hard glasses. This, of course, is one form of conventional construction which is known in the present art.

The arrangement described in the preceding paragraph is not particularly suitable for dissipating heat from the transistor located within the can, and accordingly it has been suggested to provide what is known as a heat sink in an effort to remove more efficiently the heat generated in the transistor assembly. The heat sink, however, is not in direct contact with the transistor located within the can, but rather is in contact with the external surface of the can. A conventional heat sink is normally in the form of a plate having a pair of oppositely extending portions which can be bent around the can of the transistor unit. These portions will then embrace the can and the plate of the heat sink can be welded to any suitable heat absorbing surface, as, for example, the chassis in which the transistor is mounted. It becomes apparent that in this particular construction it is necessary for the heat generated in the transistor itself to be passed first to the can of the transistor unit, and then to be transferred to the embracing portions of a heat sink, whereupon it is transferred to the plate of the heat sink, and finally transferred to the heat absorbing surface which may be the chassis.

This solution to the problem was met with limited success even though it will actually serve to dissipate a certain amount of heat. Nevertheless, there are limitations which prevent the power output of the transistor for exceeding certain predetermined limits. The biggest disadvantage of the construction resides in the fact that heat dissipation from the transistor itself depends upon an indirect exchange with the heat sink, and, accordingly, this limiting factor prevents a high power output.

The present invention provides a novel construction for a transistor unit which will provide a much better solution to the problem of heat dissipation. This novel construction is characterized by a direct heat exchange as distinguished from an indirect heat exchange whereby it is possible to dissipate considerably more heat from the transistor. At the same time, of course, much greater power outputs are possible with constructions designed according to the present invention, and hence the desirability of utilizing this novel construction will be apparent. The transistor unit is so arranged that the element which serves to dissipate heat is in direct exchange with the transistor element rather than in indirect exchange as taught by the prior art.

Another object is to provide an improved semiconductor device suitable for high power operation by virtue of having the ability to dissipate effectively large amounts of heat.

It is a further object of the present invention to provide a novel transistor arrangement which will operate more efficiently from the standpoint of heat dissipation than arrangements heretofore advanced by the prior art.

Other and further objects of the present invention will become readily apparent from a detailed consideration of the following description when taken in conjunction with the drawings in which.

Figure 1:
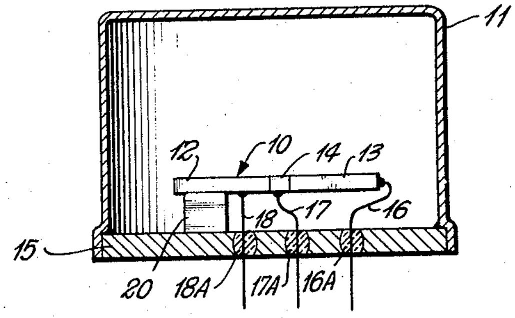
Figure 1 is a view in section through a transistor unit unit illustrating the present invention.

Referring now to Figure 1, the drawing illustrates a transistor arrangement according to the present invention particularly useful in non-grounded emitter or collector circuits. As will be noted, a transistor bar generally designated by the numeral 10 is positioned in a can 11. The transistor element is of the junction type composed of an emitter section 12, a collector part 13 and base part 14. The transistor bar 10 may be of either the N–P–N type or P–N–P type. Likewise the transistor may be composed of a silicon, germanium or other type of semiconductor material. The actual constitution of the bar 10 forms no part of the present invention as the principal concern, at the present time, is to provide an exceedingly good arrangement for dissipating the heat which will be generated in the transistor bar during its operation.

A header, as illustrated in the drawing, is composed of a metal plate 15 or other good heat conducting member. The header may be in the form of a circular disk or a polygonal disk or any other suitable form.

A lead 16 is soldered at the end of the collector section 13. A lead 17 is fixed to the base section 14. A lead 18 is soldered to the emitter section proximate the base section. The can 11 encloses the bar 10 and the rim of the can is suitably soldered or welded to the periphery of metal plate 15 of the header. The leads 16, 17, and 18 pass through suitably placed glass beads 16A, 17A, and 18A set into plate 15.

It will be seen from the drawing that the header and the transistor bar are in spaced relationship with each other. A block 20 composed of a material having high resistivity and good thermal conductive properties is positioned between the transistor bar and the header and is in contact with both elements. The block may be composed of intrinsic silicon and may be of any suitable configuration. Preferably the block is placed between the emitter portion of the transistor and the header. The block's function is to thermally conduct the heat away from the transistor to the header while preserving the electrical isolation of the transistor bar 10. It will be appreciated that silicon has a satisfactory thermal conductivity coefficient while at the same time intrinsic silicon has a sufficiently high resistivity to isolate the part 12. In this way all of the elements of the transistor are electrically isolated from ground yet heat is efficiently conducted away from the bar.

In general, the block is placed in mechanical contact with the emitter portion since the emitter is usually operated at a lower level. Furthermore, there is generally a lower impedance from emitter to ground than with the other elements of the transistor. However, the present invention is not limited thereto since it may be desirable to thermally connect, say, the collector element to the header.

The arrangement thus described provides an excellent way in which to dissipate heat from the transistor bar 10. The header plate 15, since it is in direct contact with the transistor bar 10 through a thermally conducting element, such as silicon block 20, will be in excellent heat exchange relation with the bar. In order to finally remove the heat away from the transistor assembly a heat sink of a conventional type may be placed in intimate contact with plate 15. This arrangement, as disclosed by the present invention, has proven in test to be highly successful, and it has been possible to obtain greater power dissipations with corresponding increases in signal output. This, as will be appreciated, constitutes a remarkable advance over constructions heretofore known in the art.

Figure 2:
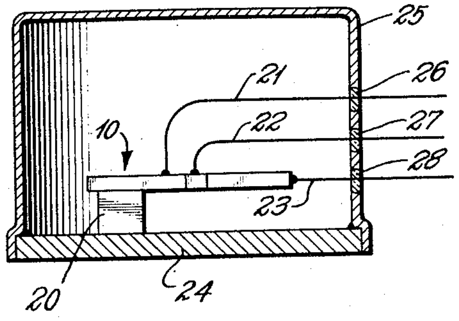
Figure 2 is a view in section through a transistor unit illustrating another embodiment of the present invention.

The assembly illustrated by the drawing is, of course, utilized in a non-grounded emitter circuit since the emitter section 12 of the transistor bar 10 is not in electrical conduction with the can or therethrough to the chassis. Nevertheless, it is extremely desirable in this assembly to maintain as great a surface area as is possible between the silicon block and the transistor bar and between the silicon block and the header. Thereby, as much as possible of the heat is transferred away from the transistor bar. Therefore, the silicon block should remain solid and not be broken up or have holes drilled therein since this would tend to detract from its ability to transfer heat. In connection therewith, it may be desirable to avoid holes in the header. Turning to Figure 2, it will be seen that leads 21, 22, and 23 need not be brought out through a header 24, but rather may be brought out of the wall of a can 25. To accomplish this, the wall portion is provided with three bores in which are located glass heads 26, 27, and 28. The leads 21, 22, and 23, in such a case, are brought to the exterior of the can for circuit connecttions via the glass heads.

Although the present invention has been shown and described with respect to particular forms, it will nevertheless be appreciated that various modifications and changes in the design and construction which are within the purview of a person skilled in this particular art are within the spirit, scope and contemplation of the present invention.

What is claimed is:

1. In a transistor assembly including a transistor bar contained within an enclosure having a metal part, the improvement comprising heat dissipation means for the transistor bar composed of a block of high resistivity, high thermal conductivity material in heat conducting relation with said transistor bar and the metal part of said enclosure.

2. In a transistor assembly as defined in claim 1 wherein said block is composed of silicon.

3. A transistor assembly comprising a transistor bar, an enclosure therefor and an element in thermal conducting relationship with said transistor bar composed of high resistivity and high thermal conductivity silicon material so that heat produced by said transistor is dissipated through said element.

References Cited in the file of this patent

UNITED STATES PATENTS 2,817,048 Thuermel et al. -------- Dec. 17, 1957
2,825,014 Willemse -------------- Feb. 25, 1958